3,020,229
COAGULATION OF DISPERSED CARBONACEOUS MATERIAL
Bruce R. Thompson, Charleston, Fred N. Hill, South Charleston, and Keith L. Smith, Charleston, W. Va., assignors to Union Carbide Corporation, a corporation of New York
No Drawing. Filed Oct. 28, 1957, Ser. No. 692,519
11 Claims. (Cl. 210—54)

This invention relates to the coagulation of a liquid suspension comprising carbonaceous material.

In a number of industries it is necessary to coagulate or flocculate and precipitate dispersed carbonaceous material from slurries of some form. Perhaps the one which comes most readily to mind concerns the coal industry. Highly competitive conditions in the coal industry in recent years have necessitated an upgrading of the products marketed including removal of for example, coal dust, more careful grading of coal according to size, and the development of a market for powdered coal. Although the consumption of coal is not undergoing a marked increase in recent years, the fraction of coal which is washed before marketing has increased steadily during recent years. The usual procedure for washing coal is to expose the comminuted product to jets of water as it comes from the crusher and perhaps as it goes over the separatory screens. The wash water from this operation may be partially recycled depending on conditions but eventually the recycle water wash medium becomes highly contaminated with suspended coal and other impurities and must either be emptied into a sewer or effluent stream, or else recycled through a sedimentation and recovery operation for reuse. This latter operation is generally accomplished by use of a large diameter Dorr thickener or similar equipment, which allows removal of the concentrated sludge from the bottom of the equipment and the relatively clear supernatant liquid can be removed from the top and recycled through the operations. As larger and larger volumes of water are used to process the coal through the washery, the larger the capacity of the Dorr thickeners to allow sufficient hold up time for sedimentation to occur. In many cases this involves not only increased equipment investment costs, but oftentimes there is a shortage of sufficient level land for such expansions particularly in the mountainous regions where coal is often produced. Nevertheless, there are three distinct advantages to recovering and recycling the slurry water compared to dumping it into a sewer or stream, namely (1) stream pollution becomes an increasing problem both with expanding operations and with increased governmental consciousness of the stream pollution problem; (2) particularly in the dry months of the year the supply of process water can often become critical considering the large volumes often used; and (3) the solids recovered from the coal washeries are in many cases of economic value in themselves and can be dried and sold as powdered coal or similar material.

By use of coagulants in the treatment of effluents from coal washeries, it is possible to realize a number of advantages. The coagulant, of course, functions primarily to reduce the sedimentation time required which in turn greatly reduces the hold up time in the Dorr classifier operation. This greatly cuts down on the size of equipment required, it reduces the amount of slurry and process water in circulation, it gives a cleaner, clearer effluent from the Dorr classifier which in turn has a greater washing capacity in the washery operations, and it can give a more compact, more easily recovered sludge which occupies less volume in the bottom of the classifier which factor again reduces the size of equipment required.

A number of other instances in which carbonaceous suspensions must be processed by coagulation include those chemical operations in which a strong acid or similar material which produces carbonized impurities in the processing operation must be purified for reuse. In the food industries and the fermentation industries considerable volumes of processed wastes of a carbonaceous or organic nature are often formed as, for example, still-bottom residues, process coking residues, and the like. Where furnace stack gases are treated with water sprays to reduce or eliminate air pollution or to recover valuable products a suspension comprising carbonaceous materials are often produced which can be recovered economically if efficient coagulants are employed.

The present invention contemplates the coagulation of a liquid suspension comprising carbonaceous material such as, for example, coal, lamp black, carbon black, soot, charcoal, carbonized products, and the like by incorporating therein a coagulating amount of poly(ethylene oxide) which has a reduced viscosity in acetonitrile of at least 1.0 and upwards to 75, and higher. The poly(ethylene oxides) employed are solid, colorless, water-soluble compounds. They appear to form homogeneous systems in water in all proportions, although the relatively higher molecular weight ethylene oxide polymers merely swell on the addition of small amounts of water. On the addition of greater amounts of water, the polymers pass into solution. The water solutions are viscous, the viscosity increasing both with the concentration of the polymer in the solution and the reduced viscosity of the polymer. The ethylene oxide polymers employed in this invention show little change in melting point with increased reduced viscosity (an indication of increased molecular weight) and the melting point, as measured by change in stiffness with temperature, was found to be about $65° \pm 2°$ C. throughout the range of reduced viscosities of from about 1.0 to about 10, and greater. These polymers, upon X-ray examination, show the sort of crystallinity exhibited by polyethylene. The crystallization temperature, as determined from measuring the break in the cooling curve, is about 55° C. The polymers of ethylene oxide possessing a reduced viscosity of at least 1.0 are hard, tough, horny, water-soluble materials.

As will be shown hereinafter the liquid suspension, dispersion, or slurry comprising carbonaceous material can also contain appreciable quantities of impurities such as magnesium nitrate, strontium chloride, calcium chloride, calcium carbonate, aluminum sulfate, potassium carbonate, ferric chloride, iron sulfate, dust, pulverized shale, etc., therein. It also has been observed that the coagulating action of the poly(ethylene oxide) employed in the instant invention is effective in liquid suspension systems wherein the pH of said systems can vary from acidic to basic.

Accordingly, one or more of the following objects will be achieved by the practice of this invention.

It is an object of this invention to provide a novel process for coagulating a liquid suspension or dispersion comprising carbonaceous matter by the addition thereto of a coagulating amount of poly(ethylene oxide). It is another object of this invention to provide a novel process for coagulating the solids content of a coal washery slurry by the addition thereto of a coagulating amount of poly(ethylene oxide). A further object of this invention is to provide a novel, efficient, economical coagulation process which results in the recovery of useful solid by-products, in the reduction of capacity of the coagulating equipment and costs generally associated with such equipment, and in recovery of water useful as a recycle medium. These and other objects will become apparent to those skilled in the art from a consideration of the instant specification.

The understanding and practice of the instant invention will be greatly facilitated by defining various terms which will be referred to hereinafter.

By the term "reduced viscosity," as used herein, is meant a value obtained by dividing the specific viscosity by the concentration of the ethylene oxide polymer in the solution, the concentration being measured in grams of polymer per 100 milliliters of solvent at a given temperature, and is regarded as a measure of molecular weight. The specific viscosity is obtained by dividing the difference between the viscosity of the solution and the viscosity of the solvent by the viscosity of the solvent. The reduced viscosities herein referred to are measured at a concentration of 0.2 gram of poly(ethylene oxide) in 100 milliliters of acetonitrile at 30° C.

By the term "intrinsic viscosity" is meant the value at zero concentration of the reduced viscosity concentration curve. In other words, intrinsic viscosity is, in effect, the reduced viscosity extrapolated to the zero concentration of polymer solution.

The term "aqueous bulk viscosity," as used herein, refers to the viscosity of the stated concentration of polymer in water, as measured at two revolutions per minute on a Model RVF Brookfield viscometer at ambient room temperature, i.e., about 24° C. to about 27° C. As the reduced viscosity increases over a range of from above about 1.0 upwards to 60, and higher, the aqueous bulk viscosity, on the average, will increase. The term is an indication of the molecular weight.

The term "bulk polymerization process" refers to polymerization in the absence of an organic medium or diluent. The term "solution polymerization" refers to polymerization in the presence of an organic medium or diluent in which both the monomer employed and the polymer produced are soluble. The term "suspension polymerization process" refers to polymerization in the presence of an organic medium in which the monomer employed is soluble and the polymer produced is insoluble. A granular product is one which is in a free flowing state and comprises particles averaging less than 5 mesh in size (U.S. Standard Sieve)."

By the term "coagulating amount," as used herein, is meant that quantity of poly(ethylene oxide) which when added to a system comprising a dispersion, suspension, or slurry of carbonaceous material in a liquid medium, is sufficient to coagulate said carbonaceous material. The amount of poly(ethylene oxide) necessary to coagulate the systems illustrated previously is governed, to an extent, on the reduced viscosity of the poly(ethylene oxide), the particular carbonaceous matter to be coagulated, and other considerations. The higher the reduced viscosity value of the poly(ethylene oxide), the lower, in general, the amount of poly(ethylene oxide) necessary to effect coagulation. The art is well apprised of the technique of coagulating, precipitating or flocculating the solids content from liquids containing these solids in dispersed or suspended form, and the over-all amount of poly(ethylene oxide) employed will be determined by the optimum conditions desired, the economics of the process, and as stated previously, the particular carbonaceous material and/or impurities present in the system.

The term "carbonaceous material," as employed herein, designated substances composed predominantly of elemental carbon therein and varying minor quantities of other ingredients such as, for example, coal, charcoal, carbonized products, soot, and the like. These illustrated classes of carbonaceous material are essentially carbon in nature, but they also contain minor amounts of ash or other impurities. Carbonaceous materials such as lamp black and carbon black, and the like, for the most part, can be considered as consisting solely of elemental carbon. It is also pointed out that wherever the term "poly(ethylene oxide)" appears throughout the instant specification that said poly(ethylene oxide) has a reduced viscosity of at least 1.0, or an apparent viscosity, aqueous bulk viscosity, or intrinsic viscosity which, if converted, would be equivalent to a reduced viscosity of at least 1.0. The poly(ethylene oxides) employed in the present invention are more aptly defined by the several physical characteristics or properties enumerated previously.

The preparation of alkylene oxide polymers such as poly(ethylene oxide), poly(propylene oxide), poly(butylene oxide) and the like which have a reduced viscosity in the range from about 1.0 to about 60, and higher, is the subject matter of the application entitled "Polymerization of Epoxides," by F. N. Hill and F. E. Bailey, Jr., Serial No. 587,933, filed May 29, 1956, and assigned to the same assignee as the instant application. The reduced viscosities of poly(ethylene oxide) referred to in the above-said application are measured in acetonitrile at a concentration of 0.2 gram of polymer per 100 milliliters of solvent at 30° C.; the reduced viscosities of the other alkylene oxide polymers are more conveniently measured in benzene. The above-mentioned application teaches the preparation of poly(alkylene oxide), e.g., poly(ethylene oxide), by polymerizing alkylene oxide in contact with certain metal carbonate catalysts, such as, for example, calcium carbonate, barium carbonate, strontium carbonate and others. These metal carbonate catalysts are advantageously employed in concentrations in the range from about 0.3 to 3 parts by weight per 100 parts by weight of alkylene oxide. The polymerization reaction can be conducted in the liquid phase at a temperature in the range from about 70° to about 150° C. It is preferred that the metal carbonate catalyst contain not more than one part by weight of nonsorbed water per 100 parts by weight of monomer, and at least 0.01 part by weight of sorbed water per 100 parts by weight of catalyst. It is further preferred that the carbonate catalyst be free from ions which reduced their catalytic activity such as, for example, chlorate and thiosulfate ions. For further information regarding the production of poly(alkylene oxide) reference is hereby made to the disclosure of the above-identified application Serial No. 587,933.

The preparation of granular poly(ethylene oxide) having a reduced viscosity in acetonitrile in the range from about 1.0 to about 60, and higher, is the subject matter of the application entitled "Polymerization of Epoxides and New Products Obtained Thereby," by F. N. Hill, J. T. Fitzpatrick, and F. E. Bailey, Jr., Serial No. 587,955, filed May 29, 1956, and assigned to the same assignee as the instant application. This application teaches the preparation of poly(ethylene oxide) by polymerizing ethylene oxide in contact with about 0.2 to about 10 parts by weight, per 100 parts by weight of monomer, of a catalyst such as the alkaline earth metal amides, hexammoniates, or the decomposition products of hexammoniates. The polymerization reaction is preferably conducted at a temperature in the range from about 0° to 70° C. and is carried out in the presence of a liquid organic medium such as the normally liquid straight and branch chain saturated hydrocarbons, cyclic and alkyl-substituted cyclic saturated hydrocarbons and the like, e.g., heptane, methylcyclopentane, etc., in which ethylene oxide is soluble and the poly(ethylene oxide) is insoluble. Agitation of the reaction mixture during the polymerization results in the production of granular ethylene oxide polymer having a reduced viscosity in acetonitrile above about 1.0, and generally above about 30 and up to 60, and higher. The granular poly(ethylene oxide) can be recovered from the reaction mixture by decanting the organic medium and vacuum drying the ethylene oxide polymer. The poly(ethylene oxide) is obtained in a granular state, i.e., a finely divided solid particle form resembling in particle size finely divided sand. For further information regarding the production of granular poly(ethylene oxide) reference is hereby made to the disclosure of application Serial No. 587,955.

Lower olefin oxides such as ethylene oxide, propylene oxide, butylene oxide, and the like, can also be polymerized, in the presence of certain divalent metal amide-alcoholate catalysts, to solid polymers having a reduced viscosity of at least 1.0. This polymerization process is subject matter of application Serial No. 674,308, entitled "Epoxide Polymerization and Compounds Therefor," by F. N. Hill, J. T. Fitzpatrick, and F. E. Bailey, Jr., filed July 26, 1957, and assigned to the same assignee as the instant application. The particular class of catalysts employed in the polymerization process of the above-said application is the metal amide-alcoholates wherein the metal radical is a divalent metal with an atomic number greater than 4 and less than 57 from group II of the periodic table. One method of preparing these catalysts is by the reaction of, for example, calcium hexammoniate with ethylene oxide in liquid ammonia to give calcium amide-ethylate. The polymerization reaction is a liquid phase reaction and can be effected at temperatures as low as −30° C. and as high as +150° C. In a preferred embodiment ethylene oxide can be polymerized in the presence of an inert liquid organic medium in which the monomer is soluble and the resulting polymer is insoluble. Agitation of the reaction mixture and controlling the temperature between about −30° C. to about +70° C. results in the production of poly(ethylene oxide) in granular form. For further information regarding this polymerization route reference is hereby made to the disclosure of the above-identified application Serial No. 674,308.

In addition, ethylene oxide polymers which have been molecularly degraded to a reduced viscosity above about 1.0 by the reaction with a halogenating agent such as an alkali metal hypochlorite or alkaline earth metal hypochlorite can be employed in the instant invention with suitable results. The molecular degradation of poly-(ethylene oxide) via treatment with a halogen or halogen-liberating compound is the subject matter of application Serial No. 668,306 entitled "Halogen Modified Poly-(Alkylene Oxide) Resins," by K. L. Smith et al., filed June 27, 1957, and assigned to the same assignee as the instant application. Ethylene oxide polymers having a reduced viscosity above about 1.0 which have been subjected to reduced viscosity loss, i.e., decrease in molecular weight, via treatment with a peroxide compound, notably peracetic acid, are likewise suitable and conveniently employed in the instant invention. The peroxide compound degradation treatment is the subject matter of application Serial No. 668,547, entitled "Alkylene Oxide Polymers," by K. L. Smith and E. C. Seltzer, filed June 27, 1957, and assigned to the same assignee as the instant application.

As stated previously the instant invention contemplates the coagulation of a liquid suspension, dispersion or slurry comprising carbonaceous material by adding thereto a coagulating amount of poly(ethylene oxide). In general, a poly(ethylene oxide) concentration in the range of from about 1.0 part per million to about 300 parts per million, and higher, based on the total weight of slurry or suspension, i.e., weight of solids plus liquid, is suitable; from about 1.0 part per million to about 100 parts per million, based on the total weight of slurry or suspension, is preferred. Expressed differently, a poly-(ethylene oxide) concentration in the range of from about 20 parts per million to about 6.0 weight percent, and higher, based on the weight of suspended solids in the suspension or slurry, gives effective results; from about 20 parts per million to about 2.0 weight percent, based on the weight of suspended solids in the suspension or slurry, is preferred. By the practice of the instant invention it will be observed that the rate of flocculation and the rate of settling of the suspended solids, and/or the rate of filtration of flocculated material, are greatly enhanced.

It is feasible to add the poly(ethylene oxide) to the suspension or slurry as an aqueous solution. The preparation of an aqueous solution of poly(ethylene oxide) beforehand eliminates the necessity of extensive stirring or agitation which can be occasioned by the addition of poly(ethylene oxide) in a solid form, and, moreover, the use of aqueous poly(ethylene oxide) solution lends itself as an attractive commercial expedient. If one desires poly(ethylene oxide) in a solid form can be added to the slurry or suspension in question, however, this method of addition is not preferred.

The instant invention also contemplates the use of poly(ethylene oxide) having an antioxidant incorporated therein such as those disclosed in application Serial No. 587,953, entitled "Chemical Process and Product," by F. N. Hill, filed May 29, 1956, and assigned to the same assignee as the instant application. Among the antioxidants disclosed in the abovementioned application include the use of diamine derivatives such as N,N-di(2-hydroxypropyl) - di(2 - hydroxyethyl)ethylenediamine, N,N,N' - tri(2 - hydroxypropyl) - N' - (2-hydroxyethyl)-ethylenediamine, N,N,N',N'-tetrakis(2-hydroxypropyl)-ethylenediamine, and others. The antioxidants can be employed at a concentration in the range from about 0.5 to 5.0 weight percent, and higher, based on the polymer weight.

The following examples are illustrative.

EXAMPLE 1

A sample of coal washery waste slurry was obtained from the Truax Traer Coal Company, West Virginia Division, Kayford, West Virginia. This sample was taken directly from the effluent from the coal washery as it was dumped into Cabin Creek. The relatively larger coal particles had been removed from this slurry in a primary separating operation. Its total solids was found to be 34.7 weight percent, and the ash content of the dry solids was 14.4 weight percent. The coal content of the solids was over 90 weight percent, based on the total solids weight. Before testing the poly(ethylene oxide) as a coagulant on this slurry, the slurry was shaken well and a sample transferred to a 100 cc. graduated cylinder and filled to the 100 cc. mark. The cylinder was then closed with a cork and rotated for 12 minutes. The rotation was stopped at the end of this period with the cylinder in an upright position, and the rate of sedimentation per minute for 15 minutes was recorded. An aqueous solution of poly(ethylene oxide) having a reduced viscosity of 1.3 (prepared by polymerizing ethylene oxide in the presence of strontium carbonate catalyst) was then added to the slurry, and the above-described rotation period was repeated for another 12 minutes. At the end of this period and with the cylinder in an upright position, the slurry in excess of 100 cc. was removed and the rate of sedimentation recorded. Several concentrations of poly(ethylene oxide) was tested by this method. Results of the tests, together with the pertinent data, are shown in Table I below.

*Table I*

AVERAGE SEDIMENTATION DROP, CC.

| Time, minutes | Control, no poly (ethylene oxide) | Poly(ethylene oxide) addition | | |
|---|---|---|---|---|
| | | 2.5 p.p.m.[1] | 25 p.p.m.[1] | 125 p.p.m.[1] |
| 6 | 5.7 | 6.5 | 5.3 | 8.0 |
| 7 | 6.2 | 7.5 | 6.0 | 9.0 |
| 8 | 6.7 | 8.0 | 6.8 | 9.8 |
| 9 | 7.2 | 8.5 | 7.8 | 10.3 |
| 10 | 7.8 | 9.3 | 8.3 | 10.8 |
| 11 | 8.2 | 9.8 | 9.3 | 11.5 |
| 12 | 8.7 | 10.3 | 9.8 | 12.5 |
| 13 | 9.1 | 10.8 | 10.3 | 13.0 |
| 14 | 9.7 | 11.5 | 11.3 | 14.0 |
| 15 | 10.2 | 12.0 | 11.8 | 15.0 |

[1] Parts per million, based on the total slurry volume. To convert to concentration based on weight of slurry solids, multiply by 2.9.

EXAMPLE 2

The same sample of coal washery slurry employed in Example 1 was subjected to the procedure outlined in said Example 1. The poly(ethylene oxide) used for these runs had a reduced viscosity of 6.4; the polymer was prepared by polymerizing ethylene oxide in the presence of strontium carbonate catalyst. The results are shown in Table II below.

Table II

AVERAGE SEDIMENTATION DROP, CC.

| Time, minutes | Control no poly(ethylene oxide) | 125 p.p.m.[1] poly(ethylene oxide) |
|---|---|---|
| 1 | 1.0 | 4.0 |
| 2 | 2.0 | 8.0 |
| 3 | 2.5 | 12.0 |
| 4 | 3.0 | 15.0 |
| 5 | 3.5 | 18.0 |
| 6 | 4.0 | 20.0 |
| 7 | 4.5 | 23.0 |
| 8 | 5.0 | 25.5 |
| 9 | 5.5 | 28.0 |
| 10 | 6.0 | 30.2 |
| 11 | 6.5 | 33.0 |

[1] Parts per million, based on total slurry volume.

EXAMPLE 3

A sample of coal washery slurry was obtained from the Truax Traer Coal Company, West Virginia Division, Mine No. 5, near Kayford, West Virginia. This sample contained 36.6 weight percent total solids which were fine enough to pass through a standard 10 mesh sieve. The coal content of the solids was over 85 weight percent, based on the total solids content. The sample was agitated in a five-gallon carboy used for transportation and a portion was transferred to a 100 milliliter graduate. The fall of the interface between the slurry and the clear supernatant liquid was measured using a cathetometer. Readings were made on the control slurry every 60 seconds over a 15 minute period. At the end of this period of time, a one cc. sample of 0.1 weight percent aqueous solution of poly(ethylene oxide) was added to the slurry with a hypodermic syringe and the contents of the 100 milliliter graduate shaken thoroughly for 30 seconds. The fall of the interface in the graduate was again recorded by means of the cathetometer. This procedure was repeated using 5.0 cc. of the 0.1 weight percent aqueous solution of poly(ethylene oxide). The polymer employed in these runs had a reduced viscosity of 6.5. It was prepared by polymerizing ethylene oxide in the presence of manganese carbonate catalyst. The said polymer was stabilized with 1.15 weight percent of N,N,N',N'-tetrakis-(2-hydroxypropyl)ethylenediamine, based on the weight of the polymer. The results are set out in Table III below.

Table III

DROP IN SLURRY—SUPERNATANT LIQUID INTERFACE, CM.

| Time, minutes | Control, no poly(ethylene oxide) | Poly(ethylene oxide) addition | |
|---|---|---|---|
| | | 10 p.p.m.[1] | 50 p.p.m.[1] |
| 1 | 0.29 | 0.58 | 1.15 |
| 2 | 0.47 | 0.94 | 2.19 |
| 3 | 0.59 | 1.32 | 3.47 |
| 4 | 0.71 | 1.70 | 3.77 |
| 5 | 0.84 | 2.11 | 3.91 |
| 6 | 0.95 | 2.54 | 3.97 |
| 7 | 1.08 | 3.02 | 4.02 |
| 8 | 1.18 | 3.47 | 4.09 |
| 9 | 1.30 | 3.63 | 4.11 |
| 10 | 1.41 | 3.73 | |
| 11 | 1.52 | 3.81 | |
| 12 | 1.65 | 3.86 | |
| 13 | 1.77 | 3.90 | |
| 14 | 1.87 | 3.92 | |
| 15 | 1.98 | 3.97 | |

[1] Parts per million, based on total slurry volume. To convert to concentration based on weight of slurry solids, multiply by 2.75.

EXAMPLE 4

A portion of coal washery slurry employed in Example 3 was diluted with equal parts of distilled water to give a solids content of 18.3 weight percent. The procedure or technique outlined in Example 3 was also followed. To this slurry there was added 50 parts per million, based on the total slurry weight, of poly(ethylene oxide) having a reduced viscosity of 5.4. The polymer was prepared by polymerizing ethylene oxide in the presence of calcium glycoxide catalyst which process is the subject matter of application Serial No. 587,954 entitled "Process for the Polymerization of Epoxides Using Alkaline Earth Metal Derivatives of Organic Hydroxy Compounds and New Compositions Obtained Thereby," by F. E. Bailey, Jr. et al., filed May 29, 1956, and assigned to the same assignee as the instant application. The polymer employed was stabilized with 0.92 weight percent of N,N,N',N'-tetrakis-(2-hydroxypropyl)ethylenediamine, based on the weight of the polymer. The results are set out in Table IV below.

Table IV

DROP IN SLURRY—SUPERNATANT LIQUID INTERFACE, CM.

| Time, minutes | Control, no poly(ethylene oxide) | 50 p.p.m.[1] poly(ethylene oxide) |
|---|---|---|
| 0.5 | | 0.85 |
| 1.0 | | 1.62 |
| 1.5 | | 2.44 |
| 2.0 | 0.28 | 3.35 |
| 3.0 | 0.78 | 4.24 |
| 4.0 | | 4.59 |
| 5.0 | | 4.74 |
| 6.0 | 1.67 | 4.83 |
| 8.0 | | 4.96 |
| 10.0 | 2.86 | 5.04 |
| 15.0 | 3.62 | 5.09 |

[1] Parts per million, based on total slurry volume. To convert to concentration based on weight of slurry solids, multiply by 2.75.

EXAMPLE 5

The same sample of coal washery slurry employed in Example 4 was subjected to the procedure outlined in said Example 4. The poly(ethylene oxide) used for these runs had a reduced viscosity of 31.3; the polymer was prepared by polymerizing ethylene oxide in the presence of calcium amide catalyst. The results and pertinent data are set out in Table V below.

Table V

DROP IN SLURRY—SUPERNATANT LIQUID INTERFACE, CM.

| Time, minutes | Control, no poly(ethylene oxide) | Poly(ethylene oxide) addition | | | |
|---|---|---|---|---|---|
| | | 5 p.p.m.[1] | 10 p.p.m.[1] | 20 p.p.m.[1] | 30 p.p.m.[1] |
| 0.5 | | 1.26 | 3.06 | 5.46 | 6.27 |
| 1.0 | | 2.32 | 4.97 | 5.92 | 6.53 |
| 2.0 | | 4.29 | 5.84 | 6.08 | 6.64 |
| 3.0 | | 5.44 | 6.07 | 6.13 | 6.72 |
| 4.0 | | 5.77 | 6.16 | 6.17 | 6.74 |
| 7.0 | 2.78 | | | | |
| 10.0 | 3.98 | 6.18 | | | |
| 15.0 | 5.49 | 6.27 | 6.21 | 6.20 | 6.78 |

[1] Parts per million, based on total slurry volume.

It is to be noted that the poly(ethylene oxide) employed in Example 5 above possessed a relatively high reduced viscosity value, i.e., 31.3. The addition of this polymer to the coal washery slurry at concentrations of 20 p.p.m. and 30 p.p.m. substantially coagulated the slurry within 30 seconds. This example teaches that poly(ethylene oxide) having a reduced viscosity above about 20 is a particular preferred coagulant when employed in coagulating amounts.

In Examples 6 through 8 to follow, the poly(ethylene oxide) employed will be designated as poly(ethylene oxide) No. 12 and poly(ethylene oxide) No. 32 for identification purposes only. The No. 12 polymer was made in a 650-gallon capacity stainless steel autoclave by the heptane suspension process using calcium amide catalyst.

The polymer contained 1.2 percent ash by weight as calcium oxide and at the time of the runs had a 1.0 weight percent aqueous bulk viscosity of 1147 centipoises as measured on the Brookfield RVF viscometer at 2 r.p.m. using a No. 1 spindle. The No. 32 polymer was made in a similar autoclave using ethylene oxide modified calcium amide catalyst. To prepare this polymer, 3600 pounds of heptane were charged to the autoclave together with a total feed of ethylene oxide of 910 pounds. The run continued for 20 hours giving a suspension in the autoclave containing 13.3 percent total solids at the end of the run. The temperature during the polymerization was 42 to 48° C., the pressure 15 pounds gauge. A total of 555 pounds of polymer was produced. The product of this reaction, Polymer No. 32, gave an intrinsic viscosity of 19.3, a reduced viscosity of 39.1, and a 1.0 weight percent aqueous bulk viscosity of 3175 centipoises as measured on the Brookfield RVF viscometer at 2 r.p.m. using a No. 2 spindle. This polymer contained 0.5 percent ash calculated as calcium oxide.

EXAMPLE 6

A slurry of carbon black in water was prepared to give an 8 weight percent total solids slurry, based on the total weight of the slurry. The particular carbon black used was "Superba Blak" made by the Binney and Smith Company. It is an impingement black having a specific gravity of 1.75, a blackness index of 191, a particle size of 18 millimicrons and an effective surface area of 146 square meters per gram. Analysis of this carbon black is specified at 90 weight percent fixed carbon and 10 weight percent volatile matter. This slurry was shaken well and a 100 cc. sample transferred volumetrically to a graduated cylinder. The sample was again shaken and allowed to stand. The drop in the interface between the slurry and the clear supernatant liquid above the slurry was then followed with a cathetometer and the drop in interface recorded as a function of time. The effect of various concentrations of poly(ethylene oxide) (added as a measured amount of 0.1 weight percent solution in water) was determined, together with the combined effect of other materials added to the carbon black suspension before the poly(ethylene oxide) was added. The results and pertinent data are set out in Table VI below.

*Table VI*

EFFECT OF POLY(ETHYLENE OXIDE) ON COAGULATION OF SLURRY COMPRISING 8.0 WEIGHT PERCENT CARBON BLACK

| Slurry additives, weight percent based on slurry total solids | pH of slurry | Poly(ethylene oxide) added | | Drop in slurry-supernatant liquid interface in cm. after settling times in minutes | | | |
|---|---|---|---|---|---|---|---|
| | | Weight percent on total slurry volume | Polymer number | 2 | 4 | 10 | 15 |
| None | 4.42 | None | | 0 | 0 | 0 | 0 |
| Do | | 10 p.p.m. | 12 | 2.2 | 2.9 | 4.0 | 5.4 |
| Do | | do | 32 | 1.1 | 2.6 | 5.2 | 9.2 |
| Do | | 20 p.p.m. | 12 | 6.4 | 9.7 | 11.7 | 12.2 |
| Do | | do | 32 | 7.6 | 11.5 | 17.1 | 19.4 |
| 2% Mg(NO₃)₂ | 3.18 | None | | 0 | 0 | 0 | 1.6 |
| Do | | 20 p.p.m. | 12 | 3.1 | 4.9 | 8.7 | 10.6 |
| Do | | do | 32 | 4.7 | 8.4 | 13.7 | 15.8 |
| Do | | 40 p.p.m. | 12 | 5.1 | 6.7 | 8.7 | 9.6 |
| Do | | do | 32 | 4.0 | 7.0 | 12.6 | 14.8 |
| 5% K₂CO₃ | 8.35 | None | | 0 | 0 | 0 | 1.0 |
| Do | | 20 p.p.m. | 12 | 1.0 | 1.4 | 4.3 | 5.9 |
| Do | | do | 32 | 6.0 | 8.3 | 12.3 | 14.0 |
| Do | | 40 p.p.m. | 12 | 2.3 | 7.8 | 11.5 | 13.0 |
| Do | | do | 32 | 2.3 | 3.5 | 6.1 | 7.8 |
| 1% FeCl₃ | 2.35 | None | | 0 | 0 | 0 | 0 |
| Do | | 20 p.p.m. | 12 | 3.6 | 6.7 | 11.3 | 14.0 |
| Do | | do | 32 | 1.3 | 1.9 | 4.7 | 7.1 |
| Do | | 40 p.p.m. | 12 | 1.5 | 2.6 | 4.4 | 6.0 |
| Do | | do | 32 | 2.2 | 3.7 | 7.1 | 9.5 |

EXAMPLE 7

A slurry of coal in water was made by grinding lumps of coal to a small particle size in a mortar and pestle and screening the grindings through a 60-mesh sieve. The coal particles passing the 60-mesh sieve were suspended in water by simple stirring to make an 8 weight percent total solids slurry, based on the total weight of the slurry. The coal used to make this slurry was obtained from Kanawha Peacock Coal Company, Mine No. 18, Kanawha County, West Virginia. This particular coal sample was found to have an ash content of 11.07 weight percent, a heat value of 12,777 B.t.u. per pound, and a moisture content of 2.12 weight percent as received. This slurry was separated into fractions and admixed with varying amounts of foreign materials and poly(ethylene oxide) coagulants in the manner of previously described Example 6. The results of these tests and the pertinent data are set forth in Table VII below.

*Table VII*

EFFECT OF POLY(ETHYLENE OXIDE) ON COAGULATION OF SLURRY COMPRISING 8.0 WEIGHT PERCENT COAL

| Slurry additives, weight percent based on slurry total solids | pH of slurry | Poly(ethylene oxide) added | | Drop in slurry-supernatant liquid interface in cm. after settling times in minutes | | | |
|---|---|---|---|---|---|---|---|
| | | Weight percent on total slurry volume | Polymer number | 1 | 4 | 10 | 15 |
| None | 7.42 | None | | 0 | 0 | 0 | 0 |
| Do | | 10 p.p.m. | 12 | 7.04 | 7.21 | 7.31 | 7.39 |
| Do | | 20 p.p.m. | 12 | 7.26 | 7.42 | 7.47 | 7.57 |
| Do | | 10 p.p.m. | 32 | 7.59 | 7.75 | 7.90 | 7.96 |
| Do | | 20 p.p.m. | 32 | 7.08 | 7.19 | 7.28 | 7.37 |
| 5% CaCO₃ | 7.80 | None | | 0 | 0 | 0 | 0 |
| Do | | 2 p.p.m. | 12 | 8.10 | 8.47 | 8.54 | 8.60 |
| Do | | 15 p.p.m. | 12 | 6.76 | 6.93 | 6.98 | 7.03 |
| Do | | 5 p.p.m. | 32 | 7.22 | 7.50 | 7.60 | 7.63 |
| Do | | 10 p.p.m. | 32 | 7.94 | 8.10 | 8.21 | 8.21 |
| 1% Al₂(SO₄)₃ | 4.18 | None | | 0 | 0 | 0 | 0 |
| Do | | 2 p.p.m. | 32 | 7.03 | 7.90 | 8.13 | 8.23 |
| Do | | 1 p.p.m. | 32 | 7.20 | 8.00 | 8.20 | 8.24 |
| Do | | 10 p.p.m. | 12 | 7.43 | 7.83 | 8.13 | 8.78 |
| Do | | 20 p.p.m. | 12 | 7.34 | 7.78 | 8.00 | 8.09 |

EXAMPLE 8

A sample of hardwood charcoal from the Victory Charcoal Company, Inc., Oak Hill, Ohio, was ground in a mortar and pestle to pass a 60-mesh sieve and an 8 weight percent total solids slurry, based on the total weight of the slurry, of this material was made in water and used to run sedimentation tests as described above in Examples 6 and 7. Results of these experiments together with the pertinent data are shown in Table VIII below.

*Table VIII*

EFFECT OF POLY(ETHYLENE OXIDE) ON COAGULATION OF SLURRY COMPRISING 8.0 WEIGHT PERCENT CHARCOAL

| Slurry additives, weight percent based on slurry total solids | pH of slurry | Poly(ethylene oxide) added | | Drop in slurry-supernatant liquid interface in cm. after settling times in minutes | | | |
|---|---|---|---|---|---|---|---|
| | | Weight percent on total slurry volume | Polymer number | 1 | 4 | 10 | 15 |
| None | 8.21 | None | | 0 | 0 | 0 | 0 |
| Do | | 2 p.p.m. | 32 | 4.01 | 6.38 | 6.55 | 6.81 |
| Do | | 5 p.p.m. | 32 | 5.70 | 6.29 | 6.39 | 6.42 |
| Do | | 10 p.p.m. | 12 | 5.58 | 5.98 | 5.96 | 6.10 |
| Do | | 15 p.p.m. | 12 | 5.64 | 5.80 | 5.78 | 5.91 |
| 1% SrCl₂ | 8.06 | None | | 0 | 0 | 0 | 0 |
| Do | | 1 p.p.m. | 32 | 3.30 | 6.30 | 6.75 | 6.76 |
| Do | | 5 p.p.m. | 32 | 4.25 | 5.94 | 5.94 | 5.94 |
| Do | | 8 p.p.m. | 12 | 5.36 | 5.61 | 5.52 | 5.52 |
| Do | | 15 p.p.m. | 12 | 5.62 | 5.90 | 5.86 | 5.88 |
| 5% CH₃COONa | 8.21 | None | | 0 | 0 | 0 | 0 |
| Do | | 2 p.p.m. | 32 | 4.61 | 7.12 | 7.45 | 7.50 |
| Do | | 5 p.p.m. | 32 | 5.29 | 6.18 | 6.22 | 6.24 |
| Do | | 10 p.p.m. | 12 | 4.70 | 5.15 | 5.20 | 5.20 |
| Do | | 20 p.p.m. | 12 | 5.12 | 5.33 | 5.34 | 5.38 |

It is obvious that various ramifications and modifications of the instant invention can be made in the light of the instant disclosure.

What is claimed is:

1. A method of coagulating an aqueous suspension containing substances composed predominantly of elemental carbon which comprises adding to said aqueous suspension a coagulating amount of poly(ethylene oxide) which has a reduced viscosity value of at least 1.0 as determined at a concentration of 0.2 gram of said poly(ethylene oxide) per 100 milliliters of acetonitrile at 30° C.

2. The method of claim 1 wherein said carbonaceous material is coal.

3. The method of claim 1 wherein said carbonaceous material is charcoal.

4. The method of claim 1 wherein said carbonaceous material is lamp black.

5. The method of claim 1 wherein said carbonaceous material is carbon black.

6. The method of claim 1 wherein said carbonaceous material is a carbonized material.

7. A method of coagulating a coal washery slurry which comprises adding to said slurry a coagulating amount of poly(ethylene oxide) which has a reduced viscosity value of at least 1.0 as determined at a concentration of 0.2 gram of said poly(ethylene oxide) per 100 milliliters of acetonitrile at 30° C.

8. The method of claim 7 wherein the poly(ethylene oxide) concentration is in the range of from one part per million to about 300 parts per million, based on the total slurry weight.

9. The method of claim 7 wherein the poly(ethylene oxide) concentration is in the range of from about 20 parts per million to about 6.0 weight percent, based on the weight of suspended solids in said slurry.

10. The method of claim 9 wherein the poly(ethylene oxide) concentration is in the range of from about 20 parts per million to about 2.0 weight percent, based on the weight of suspended solids in said slurry.

11. A method of coagulating a liquid suspension containing substances composed predominantly of elemental carbon which comprises adding to said liquid suspension a coagulating amount of poly(ethylene oxide) which has a reduced viscosity value of at least 1.0 as determined at a concentration of 0.2 gram of said poly(ethylene oxide) per 100 milliliters of acetonitrile at 30° C.

References Cited in the file of this patent

UNITED STATES PATENTS

| | | |
|---|---|---|
| 1,994,328 | Tefft | Mar. 12, 1935 |
| 2,322,185 | Bicknell | June 15, 1943 |
| 2,326,395 | Smauel | Aug. 10, 1943 |
| 2,351,259 | Fuetterer | June 13, 1944 |
| 2,394,083 | Lintz | Feb. 5, 1946 |
| 2,688,550 | McFarlane | Sept. 7, 1954 |
| 2,728,725 | Gloor | Dec. 27, 1955 |
| 2,817,645 | Weisgerber | Dec. 24, 1957 |

FOREIGN PATENTS

| | | |
|---|---|---|
| 154,799 | Australia | Jan. 19, 1954 |
| 202,957 | Austria | Oct. 15, 1958 |

OTHER REFERENCES

Kemmer: Chem. Abstracts, vol. 46 (1952), column 3686.

Dow Diamond, vol. 18, No. 1 March 1954, pages 1–3.

Guillot et al.: "Le Sang," vol. 19, pages 59–61 (1948).

Schweitzer: Rubber Chemistry and Technology, vol. 13, pages 408–414 (1940).

UNITED STATES PATENT OFFICE
CERTIFICATE OF CORRECTION

Patent No. 3,020,229 February 6, 1962

Bruce R. Thompson et al.

It is hereby certified that error appears in the above numbered patent requiring correction and that the said Letters Patent should read as corrected below.

Column 3, lines 37 to 40, strike out "A granular product is one which is in a free flowing state and comprises particles averaging less than 5 mesh in size (U.S. Standard Sieve)"."

Signed and sealed this 12th day of June 1962.

(SEAL)
Attest:

ERNEST W. SWIDER
Attesting Officer

DAVID L. LADD
Commissioner of Patents